(12) United States Patent
Polman

(10) Patent No.: US 8,689,968 B2
(45) Date of Patent: Apr. 8, 2014

(54) CONVEYOR DEVICE, CONVEYOR CHAIN AS WELL AS CHAIN LINK

(76) Inventor: Eckhard Polman, Sonsbeck (DE)

( * ) Notice: Subject to any disclaimer, the term of this patent is extended or adjusted under 35 U.S.C. 154(b) by 304 days.

(21) Appl. No.: 13/147,329

(22) PCT Filed: Feb. 3, 2010

(86) PCT No.: PCT/EP2010/000661
§ 371 (c)(1),
(2), (4) Date: Aug. 22, 2011

(87) PCT Pub. No.: WO2010/089101
PCT Pub. Date: Aug. 12, 2010

(65) Prior Publication Data
US 2012/0024674 A1   Feb. 2, 2012

(30) Foreign Application Priority Data
Feb. 3, 2009   (DE) .................. 20 2009 001 268 U

(51) Int. Cl.
*B65G 17/46* (2006.01)
*B65G 17/30* (2006.01)

(52) U.S. Cl.
USPC ............ 198/834; 198/851; 198/852; 198/853

(58) Field of Classification Search
None
See application file for complete search history.

(56) References Cited

U.S. PATENT DOCUMENTS 3,952,860 A * 4/1976 Specht .................... 198/701
6,634,491 B1   10/2003 Specht

FOREIGN PATENT DOCUMENTS

| DE | 9012050 | 10/1990 |
|---|---|---|
| DE | 4317698 | 12/1994 |
| DE | 19817125 | 10/1999 |
| DE | 19913310 | 9/2000 |
| DE | 19957009 | 6/2001 |
| DE | 102005030116 | 1/2007 |
| EP | 1375351 | 1/2004 |
| JP | 48044900 | 6/1973 |
| WO | WO 2007017107 | 2/2007 |
| WO | WO 2008/104404 | 9/2008 |

* cited by examiner

*Primary Examiner* — Kavel Singh
(74) *Attorney, Agent, or Firm* — Fay Sharpe LLP

(57) ABSTRACT

The invention relates to a conveyor device having an endless conveyor which revolves between deflection rollers and on which a receiving device for conveying goods to be conveyed is provided. The conveyor device also includes a power supply line. The conveyor element is a conveyor chain having chain links hinged together. Each link has a section of the power supply line, and the sections of adjacent chain links are coupled to each other.

19 Claims, 12 Drawing Sheets

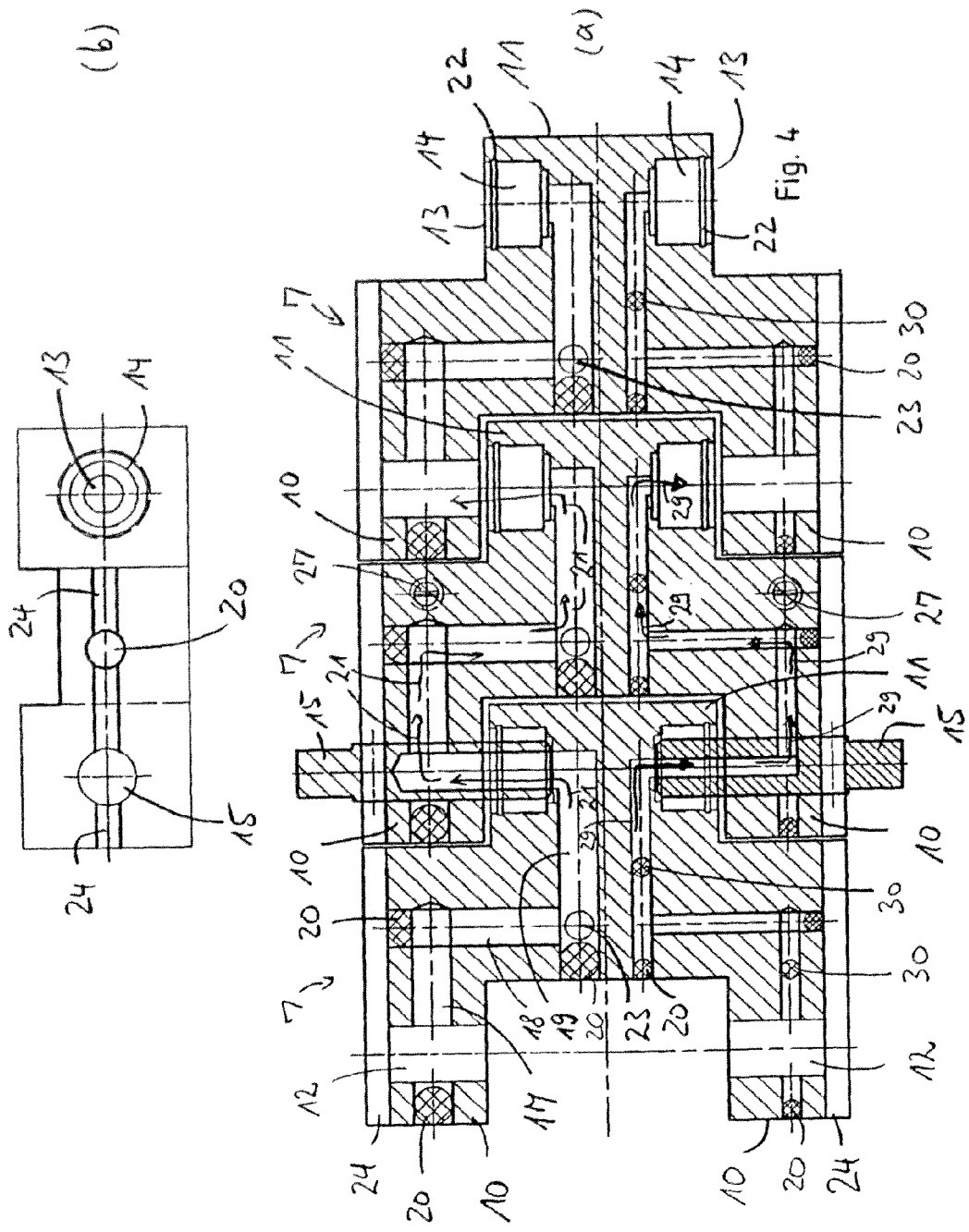

CONVEYOR DEVICE, CONVEYOR CHAIN AS WELL AS CHAIN LINK

The present invention claims priority on PCT Application Serial No. PCT/EP2010/000661 filed Feb. 3, 2010, which in turn claims priority on German Application Serial No. DE 20 2009 001 268.9 filed Feb. 3, 2009.

AREA OF THE INVENTION

The invention relates to a conveyor device, a conveyor chain as well as a chain link for a conveyor chain of a conveyor device.

BACKGROUND OF THE INVENTION

Known from WO 2008/104404 A2 is a conveyor device with an endless conveyor belt circulating between deflection rollers and to which a work piece receiving device is fastened, wherein a synchronously circulating separately designed endless power supply line is provided. Disadvantageous with this known conveyor device are the extensive maintenance and repair. Thus, upon a defect in the conveyor belt, the entire conveyor belt has to be replaced. This requires a complete disassembly of the conveyor device.

Indeed, in the prior art, e.g. from DE 199 57 009 A1, conveyor devices are known in the form of endless conveyor chains consisting of chain links hinged together. However, such conveyor chains are not provided for circulating about deflection rollers and additionally have no possibility of integrating a power supply line.

ABSTRACT OF THE INVENTION

Starting out from this, the invention is based on the object of creating a conveyor device, a conveyor chain and a chain link according to the preamble of claims 1, 15 and 16 respectively, which with simple maintenance and repair can be flexibly adapted to different conveying lengths.

SUMMARY OF THE INVENTION

The present invention solves the problems associated with prior art conveyor devices.

Accordingly, a conveyor device with an endless conveyor element, on which a receiving device for conveying material to be conveyed is provided, and with a power supply line is created, wherein the conveyor element is a conveyor chain with chain links hinged together, each link having a section of the power supply line, and the sections of adjacent chain links are coupled to each other.

The configuration of the conveyor element as conveyor chain with chain links hinged together, each of which form a section of a power supply line, has a series of advantages relative to a solution with a conveyor belt.

Thus, for the repair and maintenance, the entire conveyor belt need not be disassembled. Instead, individual chain links requiring a repair or maintenance can be released out of the conveyor chain. The part of the conveyor device that is not affected by the maintenance or repair can remain in the assembled state. This results in a saving of time and costs.

Furthermore, the conveyor device can be flexibly adapted to different conveying lengths in a simple manner. While with the known solutions an individual fabrication of a conveyor belt with predetermined length is required, the conveyor chain according to the invention can be adapted to changed production conditions by adding or removing individual chain links. In addition to the increased flexibility achievable as a result, a substantial cost saving is also achieved in that the remaining chain links can still be used while upon a change of a conveyor belt the old conveyor belt becomes completely unusable.

In addition to this, the conveyor device according to the invention has an increased mechanical load capacity compared with a conveyor belt. In particular, there is no mechanical weak point comparable with the joining region of the two ends of the conveyor belt and the individual chain links can be formed of a highly loadable material, particularly metal, plastic and/or a composite material.

Through the mechanically strong connections a high accuracy despite high mechanical load capacity is additionally achieved even at high velocities and accelerations of up to for example 6 m/s and 10 m/s$^2$, respectively, wherein the conveyor chain can be guided in a stable and precise manner through roller bearings.

The power supply line preferably running through the individual chain links in this case provides a power supply line which can be tapped at any point of the conveyor chain. In the process, electric energy by means of power supply or mechanical energy by means of compressed air, vacuum, gas, liquid, a fluid such as for example hydraulic liquid/fluid is more preferably fed into the conveyor chain at the deflection rollers and can be tapped off at any chain link and particularly on several or on all chain links regardless of their position at the time, since the power supply line extends over several chain links and more preferably over the entire conveyor chain. The energy can be used for the operation and/or the control of at least one receiving device for a work piece to be conveyed, for example in the form of a suction nozzle, a gripper or the like.

Here, the power supply line is practically designed substantially tight in order to avoid a loss of the medium compressed air, gas, hydraulic fluid or the like as well as contamination and the ingress of interfering particles. Practically, the power supply line to this end extends in sections through the individual chain links, in other words is a channel or integrated hose or an integrated cable in the case of electric power formed in the chain link for example through bores or other hollow spaces. This embodiment can be simply and cost-effectively produced with high stability and tightness and is additionally low-maintenance. The power supply line, however, can also be designed as channel fitted to the chain links at least in sections, for example through a hose or a fitted cable.

Since preferably each chain link comprises a connecting point for the connection to a preceding chain link and a connecting point for the connection to a following chain link, the section of the power supply line can extend from the one to the other connecting point. This embodiment can be effected free of interruption and connecting point particularly in the interior of the chain link, as a result of which a highly leak proof tightness with protection against external effects is ensured.

The chain links can on the one end comprise axle arms and on the other end an axle mounting, wherein the axle arms of a chain link engage about the axle mounting of an adjacent chain link in order to form the chain. As a result, an articulation about an axis, practically substantially transversely to the conveying direction and parallel to the axis of the deflection rollers is created.

Furthermore, a channel can be provided in each chain link which forms a section of the power supply line and extends from an axle arm to the axle mounting and terminates in an end face of the axle mounting that faces the axle arm of the adjacent chain link. Such a channel can be produced in a cost-effective and simple manner through bores in the chain link and is suitable for the transmission of the media compressed air, gas or hydraulic fluid at high pressures, and for receiving a cable or of cable sections.

If in addition a further channel extending from the other axle arm to the axle mounting and terminating in the end face of the axle mounting corresponding to that other axle arm is provided in the chain link, a further power supply line can be realised in the conveyor chain. The two power supply lines in this case can be designed independently and separately and they can conduct different forms of power, e.g. a channel can contain hydraulic fluid and the other conduct compressed air or electric power.

A hinged connection of two chain links by using an axle pin can be produced cost-effectively, in a mechanically stable and in a simple manner. Thus, an axle pin can extend through an axle arm as far as into the axle mounting and a further axle pin can extend through the further axle arm into the face end of the axle mounting located opposite.

If the axle pin comprises a pin channel on the one end terminating in its end face facing the axle mounting and on the other end in a pin channel terminating in its lateral surface a connection of the power supply line section of a chain link can be formed in a simple manner with the corresponding power supply line section of the adjacent chain link. The formation of the pin channel in this case can be accomplished in a mechanically simple manner through two bores, one in the end face and one in the lateral surface of the axle pin. Here, the one axle pin can be assigned to a power supply line and the other axle pin to a further power supply line, provided two independent power supply lines run through the conveyor chain.

In a further embodiment at least two chain links and more preferably all chain links can be interconnected via a connecting element in the manner of a universal joint. The chain links of the conveyor chain can then be pivoted in a hinged manner relative to one another about several axes.

The conveyor chain in this embodiment can be routed anyhow in space for example around corners or in order to bring about an inclination of the work pieces when these have to be picked up for example horizontally from a stack and have to be handed over at an angle thereto.

The connecting element can have a channel or two separate channels.

In the simplest case, the connecting element comprises four connecting arms which extend approximately cross-shaped out of a connecting element main body, or is designed cross-shaped out of four connecting arms. Two connecting arms each located opposite are connected to a chain link and the two other connecting arms likewise located opposite each other to the adjacent chain link, for example inserted in corresponding bores in a sealing manner.

In the case of a single power supply line a channel can extend into all four connecting arms. In the case of two power supply lines a channel can extend into two adjacent connecting arms and a further channel into the two other connecting arms.

The channel mouth is preferably provided in the lateral surface of a connecting arm, so that in the inserted state of the connecting arm it is coupled to a channel mouth of a channel in the receiving chain link. Since the chain link should be rotatable relative to the connecting arm the mouth is provided for example in the shape of a slit but can also be a bore.

Furthermore, a conveyor chain for such a conveyor device is created, which comprises several interconnected chain links of which at least two comprise a section of a power supply line, wherein the sections are coupled together.

Finally, a chain link for a conveyor chain of a conveyor device is created, which comprises a section of a power supply line and as described above or below in connection with the conveyor device and/or chain can be variously configured. The respective features are also applicable to the individual chain link separately from the conveyor chain and the conveyor device individually or in any combinations.

The chain link can be constructed of multiple parts. In particular, the chain link can consist of an upper and a lower shell which on the surfaces facing each other can comprise recesses that form the channels or parts of the power supply line or lines. If applicable, a middle part or a middle part structure can be inserted sandwich-like between upper and lower shell.

The conveyor chain can be assembled of identical or different chain links. The power supply line can be endless.

In summary, the present invention is directed to a conveyor device with an endless conveyor element circulating between deflection rollers on which a receiving device for conveying goods to be conveyed is provided, and with a power supply line. In one non-limiting embodiment of the invention, the conveyor element is a conveyor chain with chain links hinged together, and each link has a section of the power supply line and the sections of adjacent chain links are coupled to each other. In another and/or alternative non-limiting embodiment of the invention, a section of the power supply line is provided on or in the respective chain link. In another and/or alternative non-limiting embodiment of the invention, each chain link comprises a connecting point for the connection to a preceding chain link and a connecting point for the connection to a following chain link and the section of the power supply line extends from the one to the other connecting point. In another and/or alternative non-limiting embodiment of the invention, a chain link at one end comprises two axle arms and on the other end an axle mounting and the axle arms of the chain link engage about an axle mounting of an adjacent chain link. In another and/or alternative non-limiting embodiment of the invention, the chain link has a channel extending from one of the axle arms to the axle mounting and terminating in the end face of the axle mounting assigned to this axle arm is provided, which forms the section of the power supply line in the chain link. In another and/or alternative non-limiting embodiment of the invention, the chain link has a further channel extending from the other of the axle arms to the axle mounting and terminating in the end face of the axle mounting assigned to this other axle arm is provided, which forms a section of a further power supply line. In another and/or alternative non-limiting embodiment of the invention, at least one of the axle arms is hinged together with the axle mounting via an axle pin. In another and/or alternative non-limiting embodiment of the invention, the axle pin comprises a pin channel terminating on the one end in its end face facing the axle mounting and on the other end in its lateral surface, which connects the power supply line section of a chain link to the corresponding power supply line section of the adjacent chain link. In another and/or alternative non-limiting embodiment of the invention, adjacent chain links are connected to one another via a connecting element in the manner of a universal joint. In another and/or alternative non-limiting embodiment of the invention, the connecting element comprises a connecting channel or two separate connecting channels. In another and/or alternative non-limiting embodiment of the invention, the connecting element comprises four connecting arms which approximately extend in the shape of a cross. In another and/or alternative non-limiting embodiment of the invention, a connecting channel extends into all four connecting arms. In another and/or alternative non-limiting embodiment of the invention, a connecting channel extends into two adjacent connecting arms and a further connecting channel into the two other connecting arms and the connecting channels in each case form a section of one of two power supply lines. In another and/or alternative non-limiting embodiment of the invention, a channel mouth is provided in the lateral surface of a connecting arm and is coupled to a channel mouth of a channel in the chain link receiving the respective connecting arm. In another and/or alternative non-limiting embodiment of the invention, a chain link is formed of multiple parts. In another and/or alternative non-limiting embodiment of the invention, a chain link comprises an upper shell, a lower shell, a basic body and/or a middle construction. In another and/or alternative non-limiting embodiment of the invention, a chain link is formed of plastic.

Further features and characteristics of the invention are obtained from the following description of exemplary embodiments making reference to the attached drawings.

FIGURE DESCRIPTION

FIG. 4a illustrates a section through three chain links in succession;

FIG. 4b shows a lateral view of only the middle chain link of FIG. 4a;

FIG. 4c is a lateral view of a conveyor chain section;

FIG. 4d is a section along the line A-A of FIG. 4c;

Figure 6:
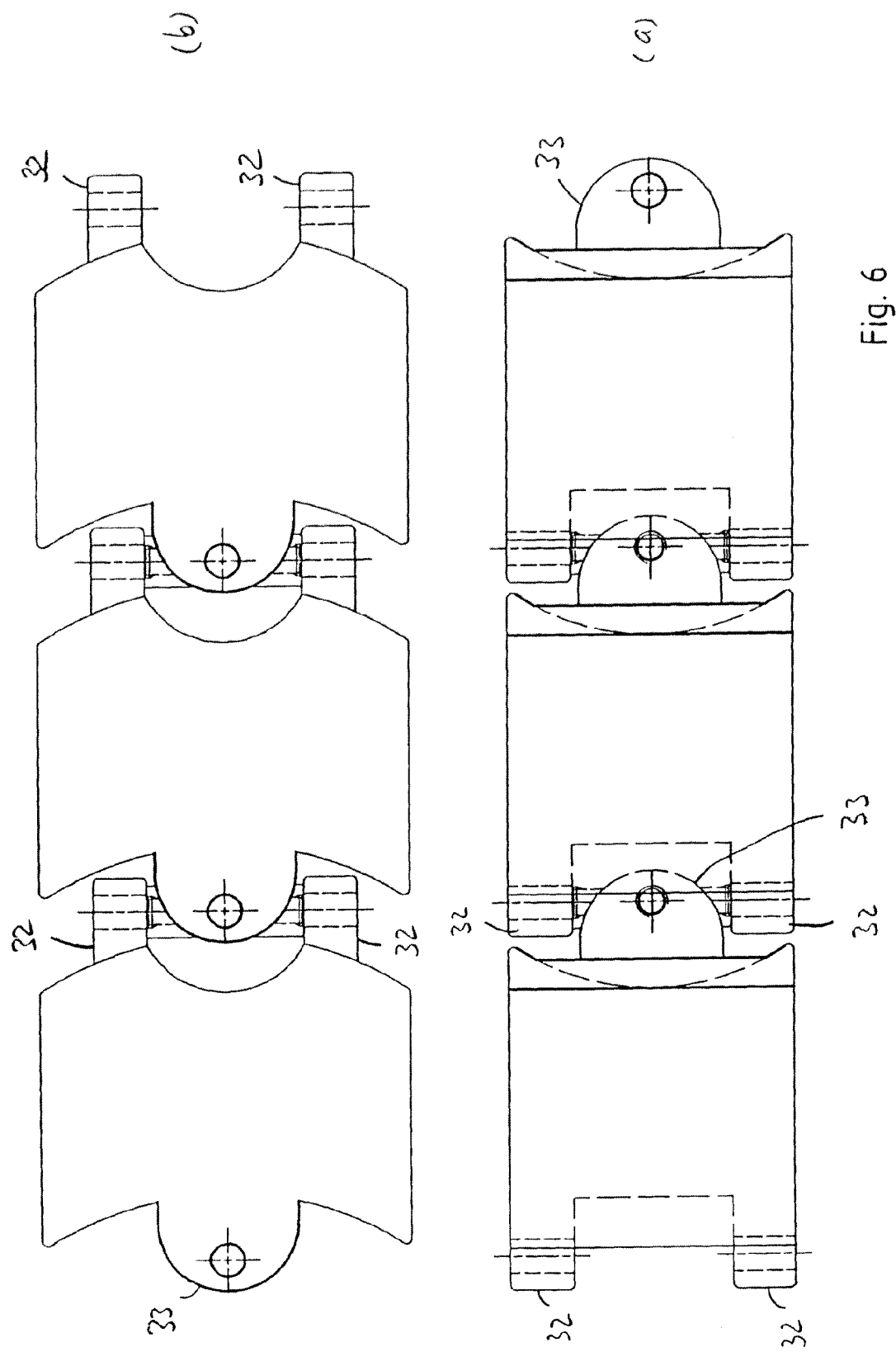
Figure 6:
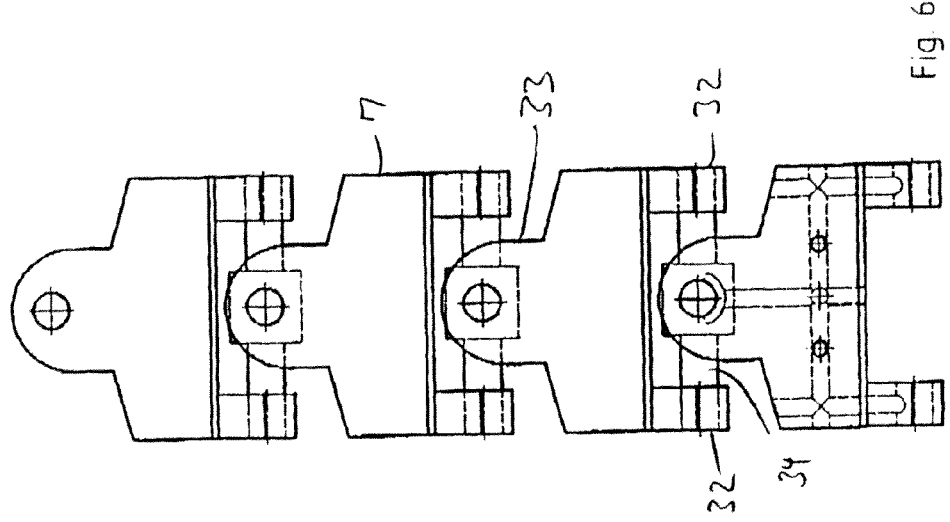
Figure 6:
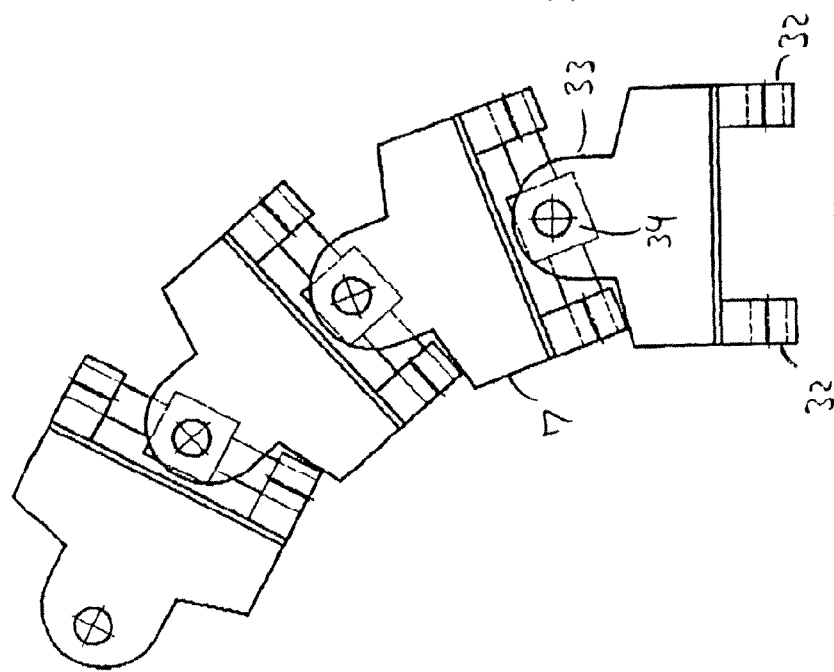
Figures 6, 7A:
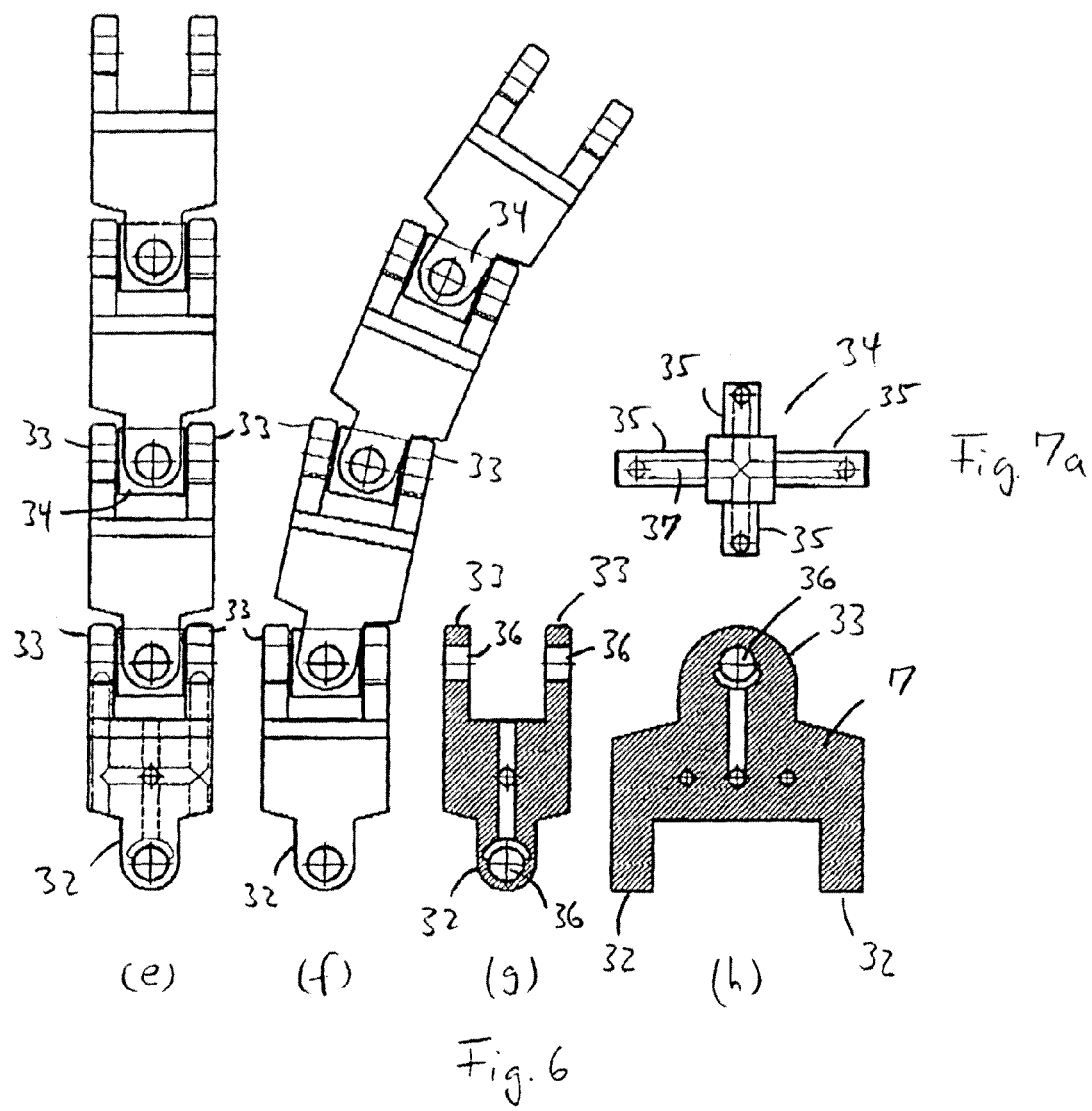
Figure 7:
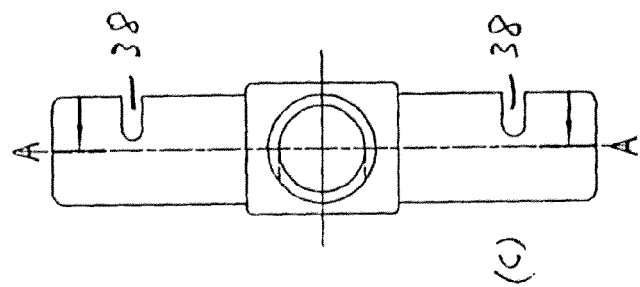
Figure 7:
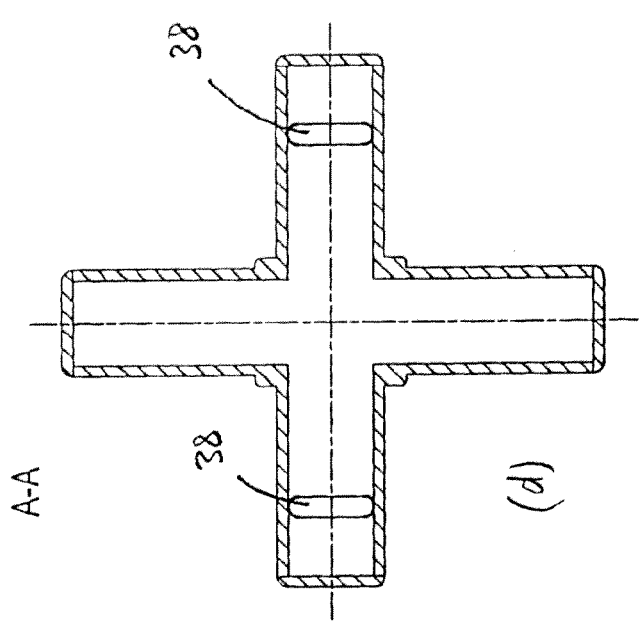
Figure 7:
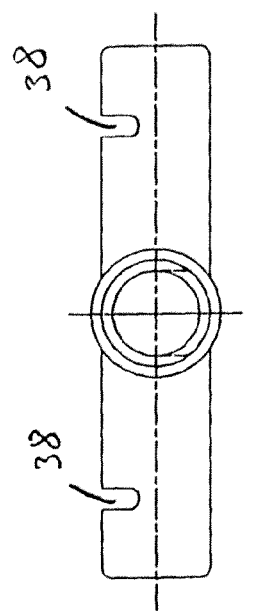
Figure 7:
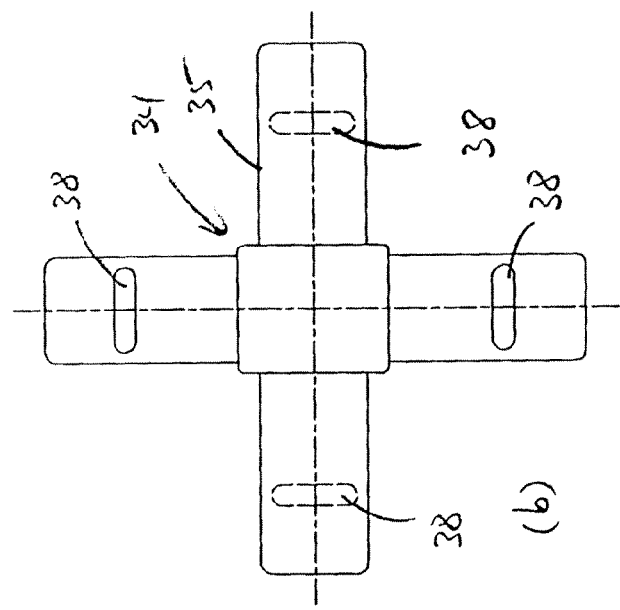
Figure 8:
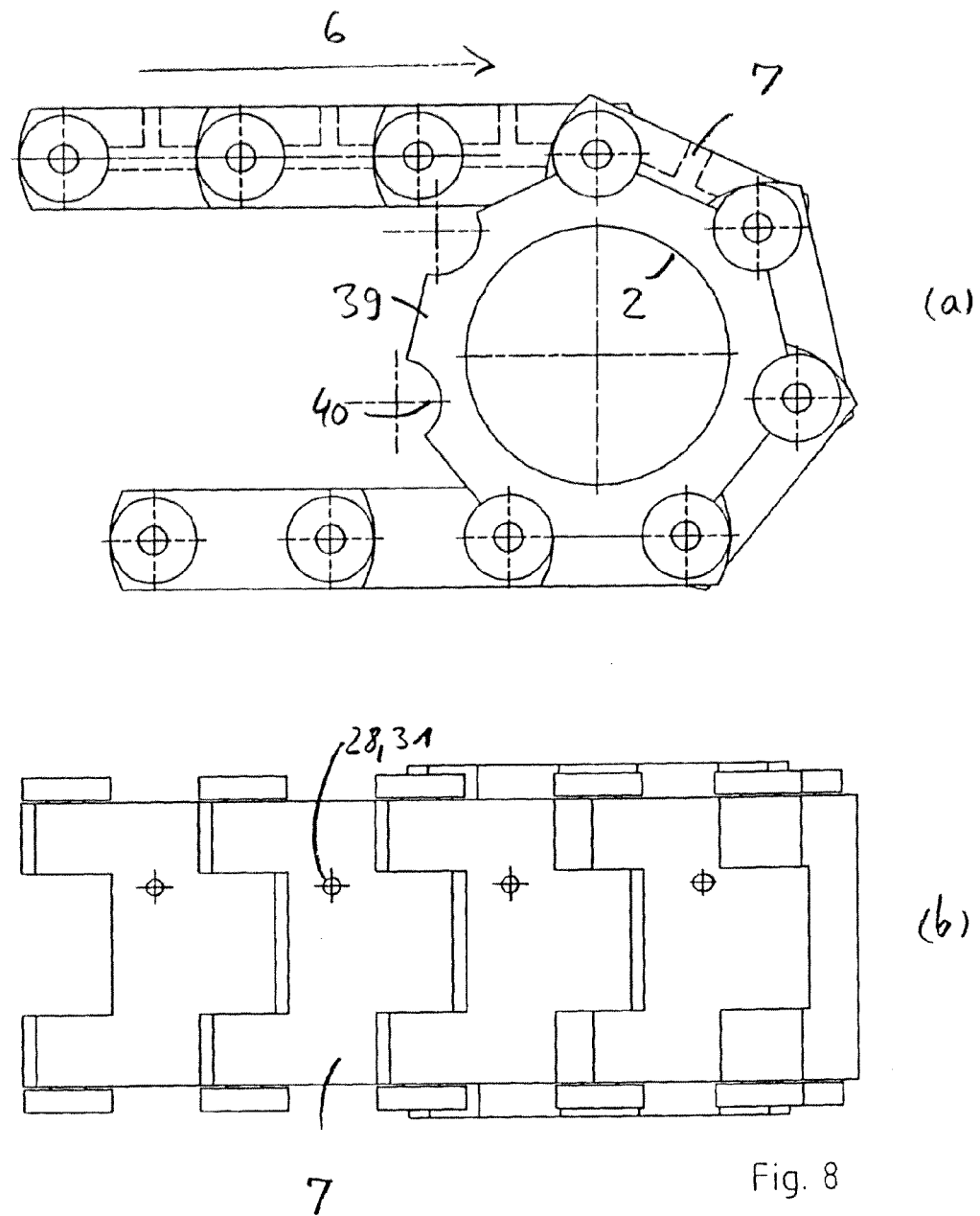
Figure 9:
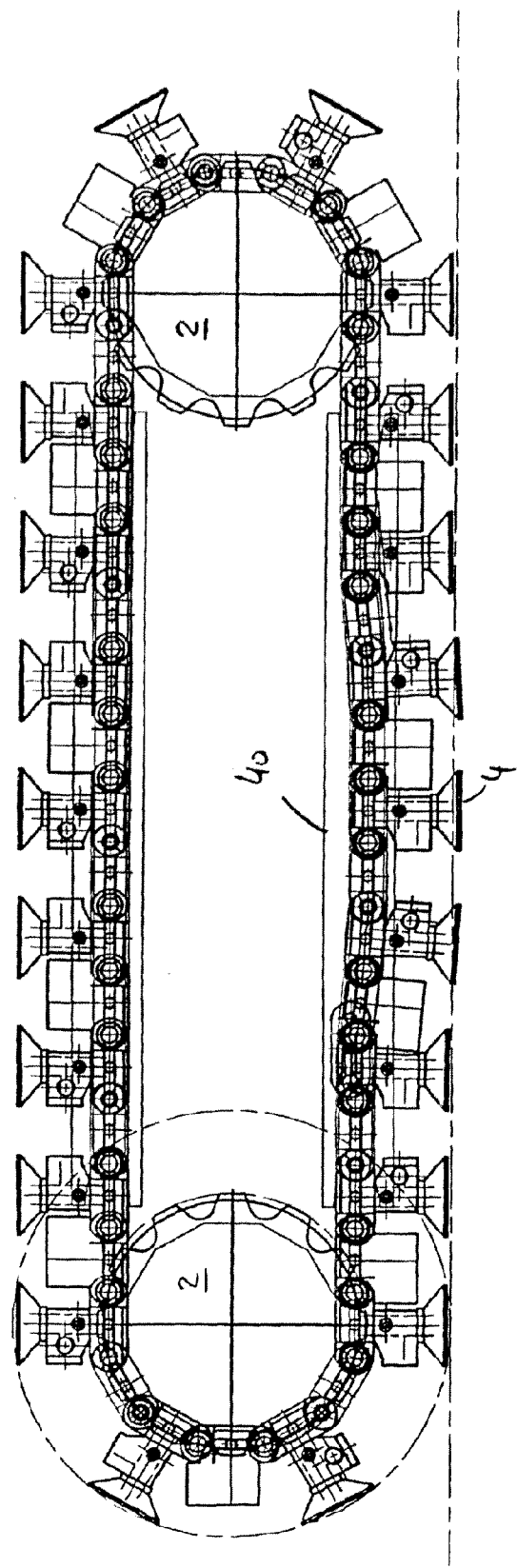

FIG. 6a and FIG. 6b each show a further embodiment of a conveyor chain;

FIGS. 6c, 6d, 6e and 6f show a further embodiment of a conveyor chain in the bent state in top view, in the straight state in top view, in the straight state in lateral view and in a state bent in another direction in lateral view, respectively;

FIGS. 6g and 6h show a chain link of the embodiment according to FIG. 6c to 6f in transverse and longitudinal section respectively;

FIG. 7a illustrates a connecting element cross section;

FIG. 7b shows a further connecting element in top view;

FIGS. 7c and 7e show two lateral views of this connecting element;

FIG. 7d shows a section along the line A-A of FIG. 7c;

FIG. 8a and 8b illustrate a chain section in the region of a deflection roller in lateral view and top view, respectively; and, FIG. 9 illustrates a deflection of the conveyor chain.

DESCRIPTION OF THE EMBODIMENTS

Figure 1:
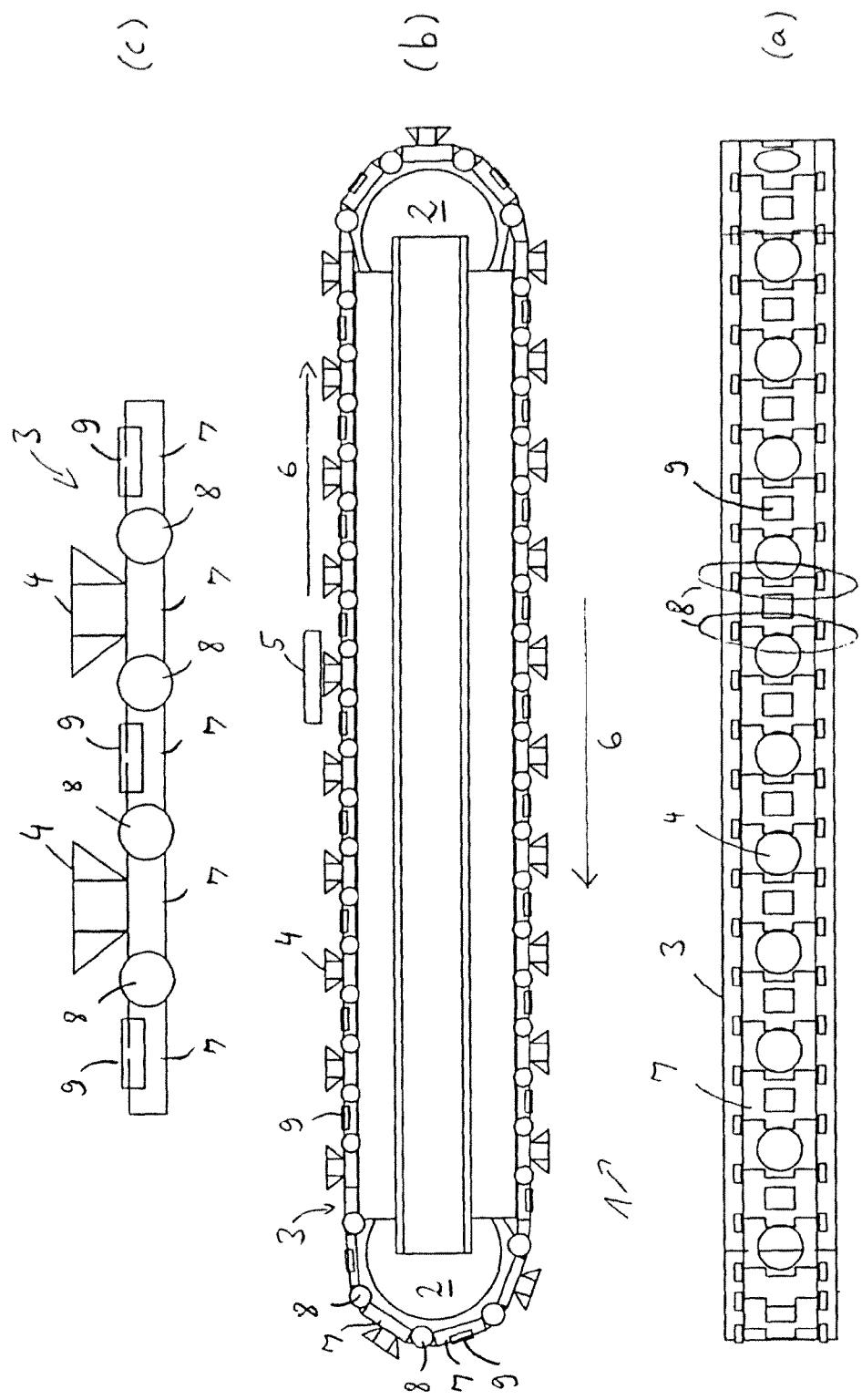
FIGS. 1a, 1b and 1c illustrate a conveyor device in top view, in lateral view and an enlarged section thereof, respectively.

Referring now to the drawings wherein the showings are for the purpose of illustrating a preferred embodiment of the invention only and not for the purpose of limiting same, the conveyor device 1 shown in FIG. 1 comprises an endless conveyor element circulating in this case between two deflection rollers 2 in the form of a conveyor chain 3 with receiving devices 4 for conveying goods to be conveyed. The receiving devices 4 can receive work pieces 5 of which only one is exemplarily illustrated, conveying said work pieces along the conveying direction 6 in which the conveyor chain 3 circulates.

Conveying can be effected in a lying or suspended manner. Different work pieces 5 can be conveyed, for example circuit boards, metal plates, glass plates, window panes, automotive components, electronic components etc. The work pieces 5 need not be flat but can be shaped in any way.

The receiving devices 4 in the embodiment shown in FIG. 1 are represented as suction cups. These create a vacuum in order to firmly grasp the work pieces by suction. The work pieces 5 are picked up by the receiving devices 4 at suitable points, for example from a stack of car windows, conveyed along the conveying direction 6 and fed to a destination. The receiving devices 4 in this case are more preferably individually controllable in such a manner that they can provide or create for example a vacuum for picking up a work piece 5, if applicable are for example deflected in the direction of the work piece for picking up said work piece, and release the work piece at the destination.

The conveyor chain 3 consists, see FIG. 1c, of chain links 7 hinged together. The chain links 7 in this case are exemplarily illustrated with a flat main body and a joint region 8, see FIG. 1a. The joint region 8 in the embodiment shown, in which the conveyor chain 3 extends round about two deflection rollers 2, is designed so that the individual chain links have a movability at least substantially parallel to the axis of deflection rollers 2.

In the embodiment shown, every second chain link is exemplarily provided with a receiving device 4. The chain links not provided with a receiving device 4 in this case exemplarily comprise an electronic control element 9. Each receiving device 4 in this case is assigned an electronic control element 9, which can control the receiving device 4 at least with respect to the picking up of a work piece 5 and the handing over of a picked-up work piece 5. If applicable, the receiving devices 4 are spaced further from one another. An electronic control element 9 can also comprise the control logic for several receiving devices 4, so that some chain links 7 are vacant or instead of the shown control elements 9, comprise receiving devices 4.

At least one of the deflection rollers 2 at its outer circumference comprises a toothing which can be brought into engagement with the conveyor chain 3 in such a manner that through rotary drive of the deflection roller 2 the conveyor chain 3 is driven in the conveying direction.

Figure 2:
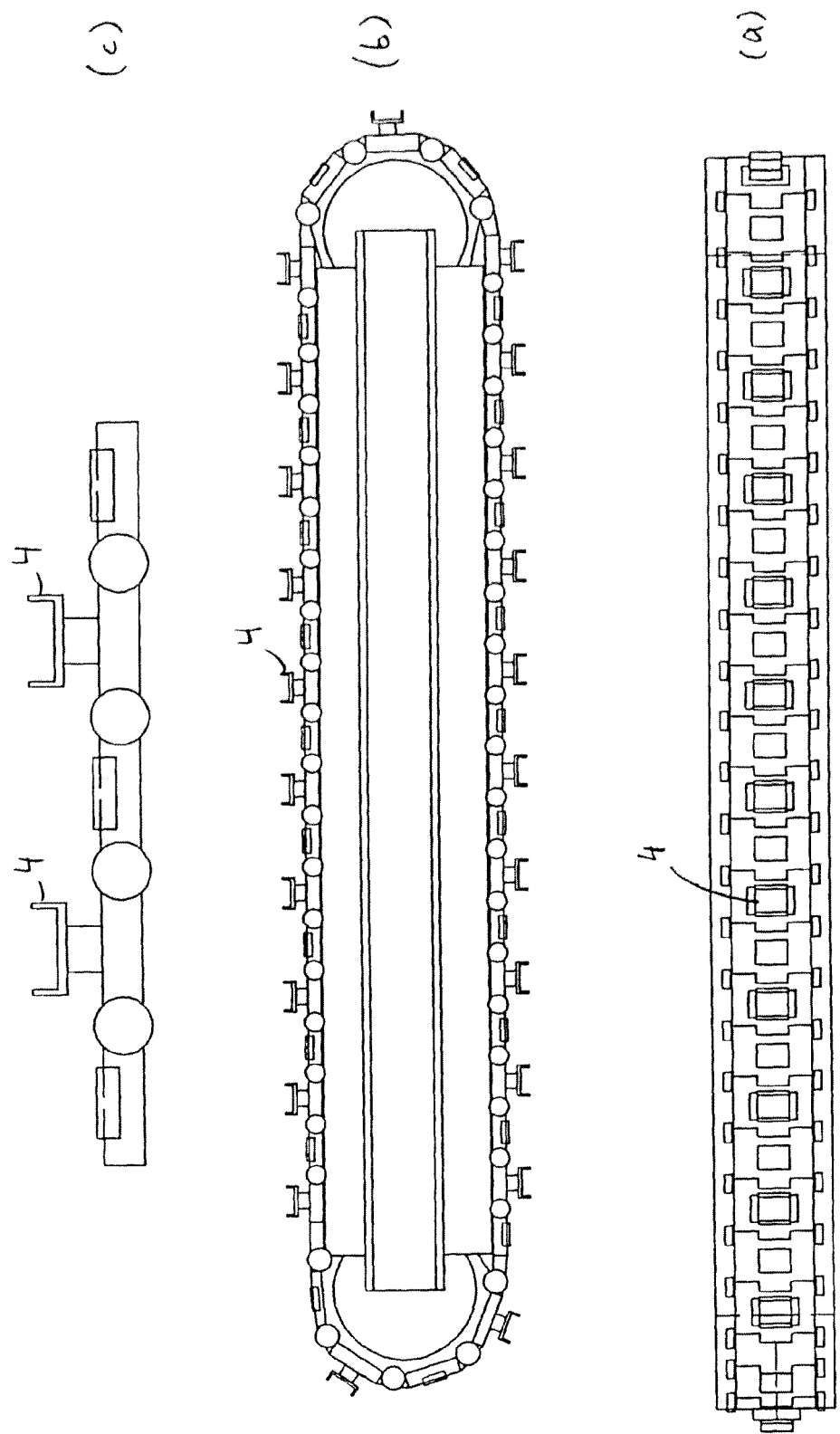
FIGS. 2a, 2b and 2c illustrate a further embodiment of the conveyor device in top view, lateral view and an enlarged section thereof, respectively.

In the embodiment shown in FIG. 2 the receiving devices 4 are shown in the form of mechanical grippers. Such mechanical grippers can be actuated via compressed air, gas, hydraulically and/or electrically.

Figure 3:
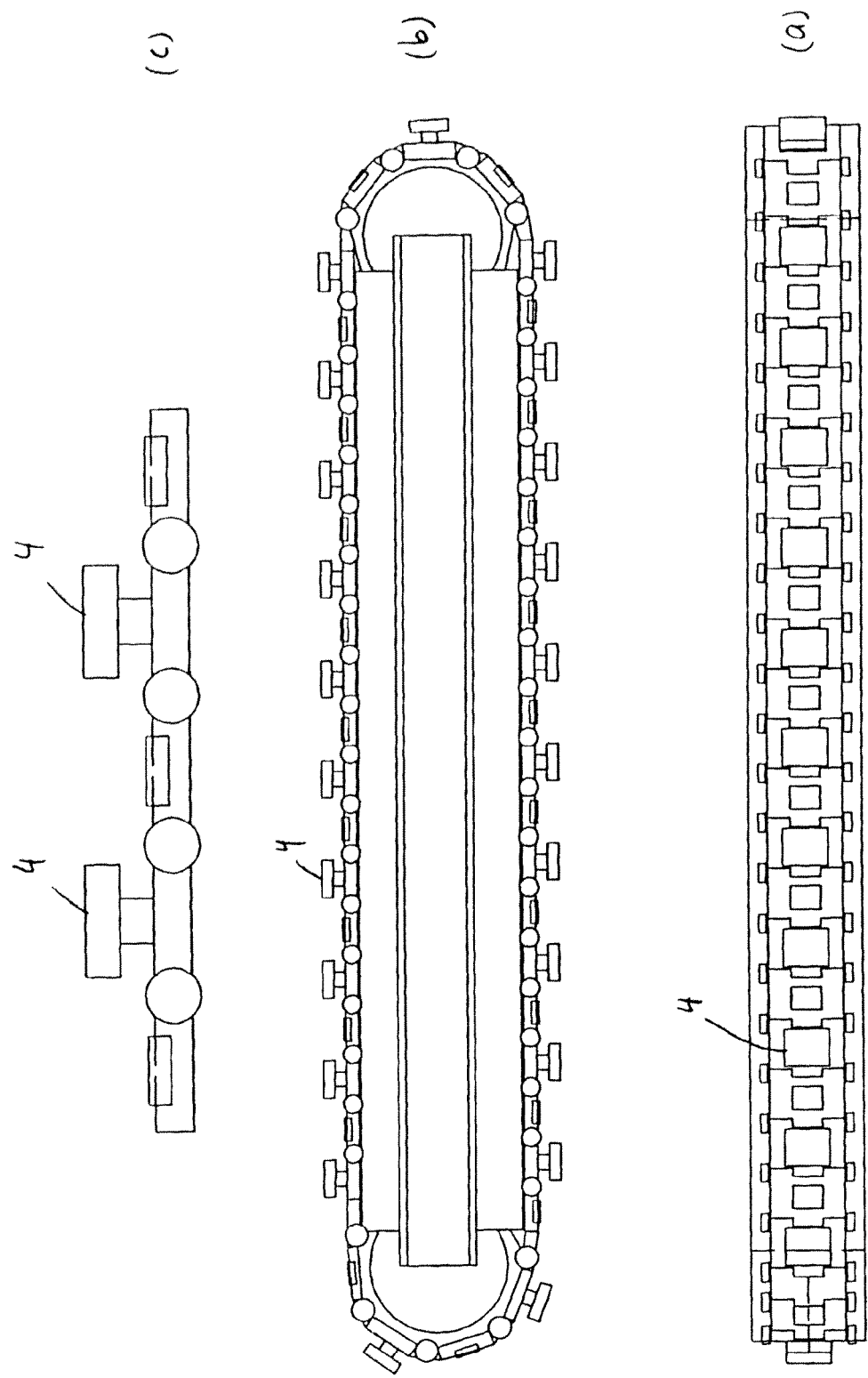
FIGS. 3a, 3b and 3c illustrate a further embodiment of the conveyor device in top view, lateral view and an enlarged section thereof, respectively.

FIG. 3 illustrates an embodiment wherein the receiving devices 4 are electromagnets.

Figure 4:
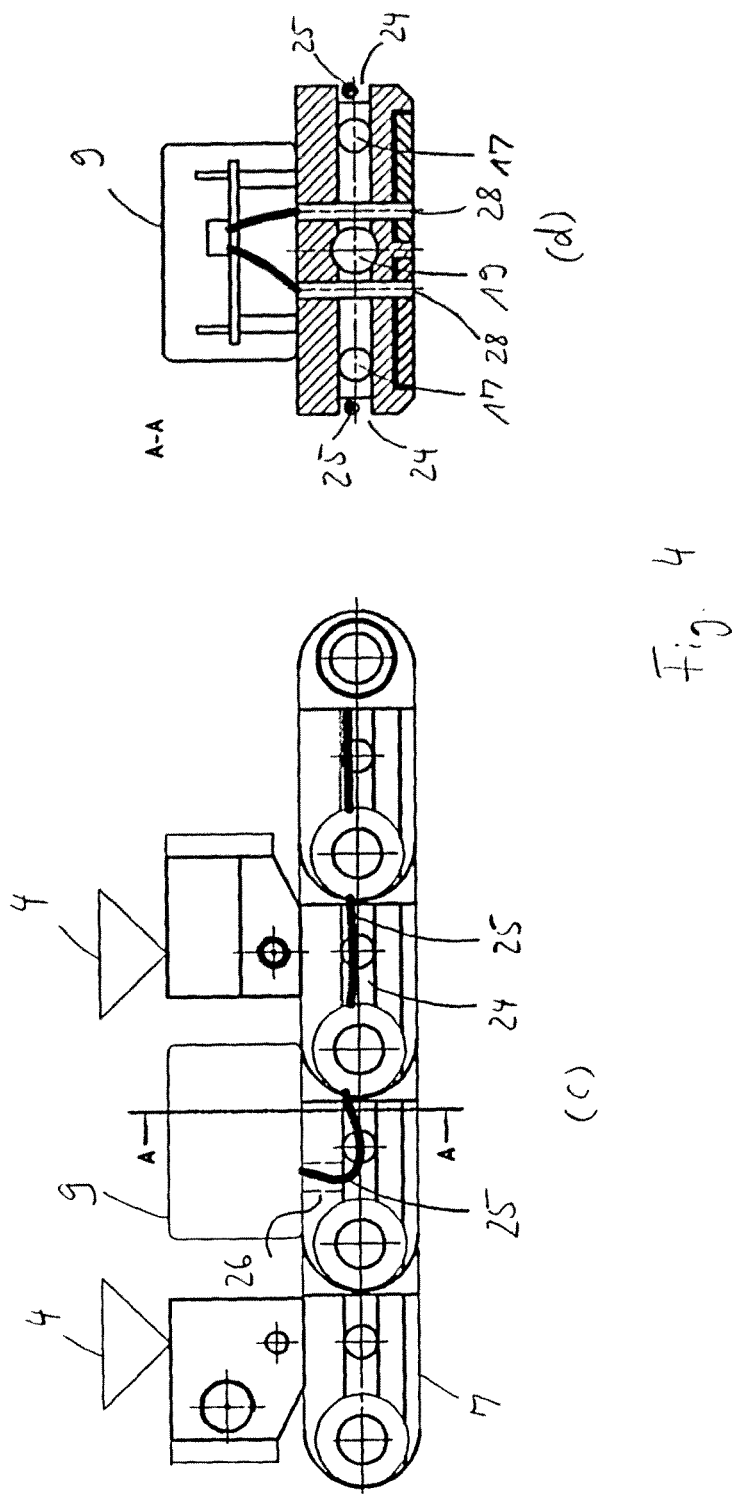

The construction and the connection of exemplary chain links 7 is illustrated in FIG. 4a.

Each shown chain link 7 in this case comprises two axle arms 10 on one end and an axle mounting 11 on the other end. The axle mounting 11 of a chain link 7 is engaged about by the axle arms 10 of the adjacent chain link 7. For the hinged connection of the chain link 7 the axle arms 10 have axle bores 12 which extend through the thickness of the respective axle arm 10. Aligned with the axle bores 12 the axle mountings 11 practically have two head bores 13, namely a head bore 13 each on the end face of the axle mounting 11 adjacent to an axle arm 10 and a further head bore 13 on the end face of the axle mounting 11 adjacent to the other axle arm 10. Bearing bushes 14, e.g. in the form of needle bearings or the like can be inserted in the head bores 13.

If two adjacent chain links 7 are arranged one after the other in such a manner that the axle arms 10 of the one chain link 7 engage about the axle mounting 11 of the other chain link 7 and the axle bores 12 are in alignment with the head bores 13, a hinged fixed connection can be established by driving in axle pins 15. To this end, a first axle pin 15 is inserted through the one axle arm 10 and inserted in the bearing bush 14 of the axle mounting 11. A further axle pin 15 is inserted through the other axle mounting 11 and inserted in the corresponding upper bearing bush 14. The axle pins 15 are then fastened relative to the axle arms 10 for example through a pin, clamping or screw connection or the like such as for example a grub screw. As the result, the axle pins 15 together with the axle arms 10 form a fixed unit so that the chain link 7 via the axle pins 15 can rotate about the axle pin axis 16 in the bearing bushes 14. The connection in all embodiments can also take place the other way round, in that the axle pins 15 with the axle mounting 11 form a fixed unit and are rotatable in bearing bushes in the axle arms 10.

The chain links 7 together form a power supply line which preferably extends through the entire conveyor chain 3 and in any case at least through a part thereof. The section of the power supply line in the chain link 7 is practically established through the axle bore 12, three further bores 17, 18, 19 as well as the head bore 13. The bore 17 extends transversely to the axle bore 12 along the axle arm 10 but not through it. It crosses the axle bore 12, so that between the axle bore 12 and the bore 17 there is a connection. The bore 18 extends through a middle section of the chain link 7 transversely to the bore 17 as far as approximately the middle of the chain link 7. The bore 19, which forms a connection to the head bore 13, extends transversely thereto. Thus a channel between the axle bore 12 and the head bore 13 through the chain link 7 is created. The ends of the bores 17, 18, 19 are practically sealed by means of seals 20. The power supply line thus extends along the arrows 21 through the adjacent chain links 7.

Seals, for example in the form of O-rings 22, seal the axle pins 15 relative to the bearing bushes 14. Sealing of the axle pins 15 relative to the axle bores 12 is possible but not absolutely necessary, if the axle pins 15 have a accurately fitting diameter or are inserted in the axle bores 12 in a clamping manner since no relative movement between axle pins 15 and axle bores 12 is intended.

Via valve openings 23, which can be arranged at any point in the channel, the channel can be supplied with a medium such as compressed air, gas or a hydraulic fluid or the like. The valve openings 23 are advantageously closed and only opened when they are in engagement with filling devices at the deflection rollers 2. Thus, via the deflection rollers 2, the channel can be filled with the medium and remain filled.

The medium in the channel serves to actuate the receiving devices 4. Thus, compressed air can be fed from the channel section in a chain link 7 to a venturi nozzle on the chain link 7, which from the compressed air creates a vacuum, using it to actuate the suction cups which can hold the work pieces 5 by means of vacuum. The receiving devices 4, embodied in the form of grippers, can also obtain their power through the medium in the channel, e.g. through a hydraulic fluid. If the receiving devices 4 for example comprise electromagnets, the power supply line practically does not transmit any mechanical power, but electric power. To this end, cables can run in the channels or channel sections in the chain link.

In addition, the chain links 7 preferentially comprise cable channels 24. The cable channels 24 are preferentially arranged at the edge sides on the chain links 7, see also FIG. 4c, but which shows a further embodiment of the chain links 7. Through the cable channels 24 cables 25 can extend. These cables 25 in this case can be routed via passage openings 26, see FIG. 4c, or on the outside in an exposed manner to the electronic control elements 9 on the chain links 7, in order to supply these with electric power and/or signals. The cables 25 in this case form a supply line for electric power which can likewise extend over the entire conveyor chain 3 in an endless manner. Practically, a two-wire bus or the like, more preferably an ASI-bus is used for this. Thus, a cable channel 24 can be provided for a cable 25 with a first polarity, for example the positive terminal, while the other cable channel 25 can be provided with a cable 25 for an electric potential of a second polarity, e.g. ground. Via these two cables 25 the electric power for operating the electronic control elements can be provided. In addition, via these two cables 25, a more preferably digital signal transmission 2 to and if applicable from the electronic control elements can also be realised. Feeding-in of the signals in this case is effected in the known manner at the deflection rollers 2 for example via contact pins which engage on contact surfaces 27, see FIG. 4a, on or in contact bores 28, see FIG. 4d.

The embodiments of FIG. 4a and FIG. 4c, 4d differ through the number of channels. In FIG. 4a two channels are provided, while in FIG. 4d only one channel is provided.

The first channel in FIG. 4a runs along the arrows 21. The second channel runs independently thereof along the arrows 29. This channel can form a second power supply line independent of the first power supply line, wherein for this purpose valve openings should likewise be provided. In the shown example, however, seals 30 are provided so that a connection between the chain links 7 along the arrows 29 is interrupted. The seals 30 in this case can be preferentially bridged in a controlled manner through devices on the chain link 7.

In FIG. 4b only one channel is exemplarily provided. The bore 19 is practically arranged in the middle and via bores 17 connected to both axle bores 12.

Figure 5:
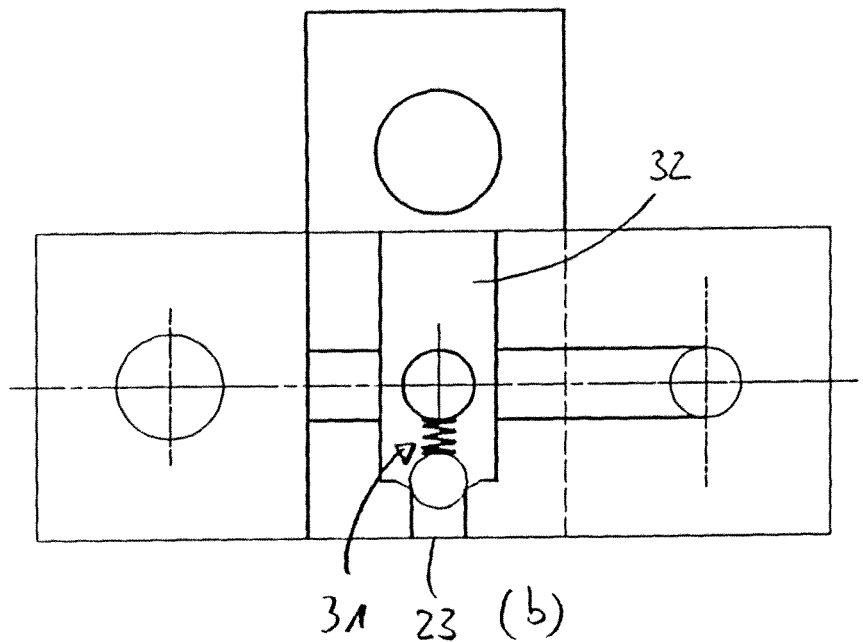
FIG. 5 illustrates a further embodiment of a chain link.
Figure 5:
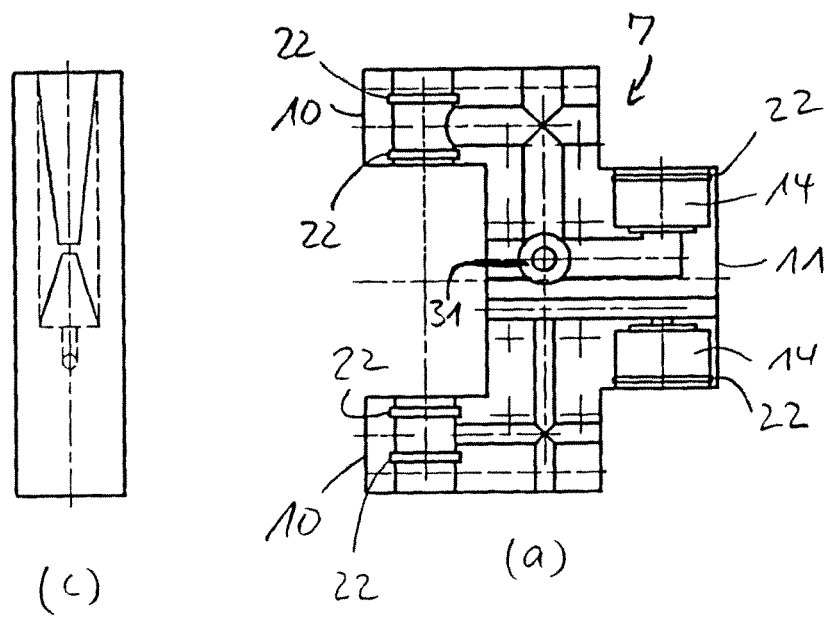

FIG. 5 illustrates a single chain link 7 of a further embodiment. A valve 31, in FIG. 5b embodied in the form of a non-return valve, is provided in the channel in order to feed medium into the channel at the deflection rollers 2.

A connection 32 extends here from the valve opening 23 to the chain link surface, where it for example terminates in a venturi nozzle, see FIG. 5c, which more preferably in a controlled manner can create a vacuum for the receiving device 4 from the pressure loading.

In FIG. 6, further embodiments of the invention are shown. In these embodiments an articulation in two axes in the manner of a universal joint is provided.

To this end, the chain links 7 on both ends each comprise two axle arms 32, 33 whose axles stand perpendicularly on top of each other. An articulation about both axes is created, as a result of which the conveyor chain need not only be guided in a linear manner but can rather also be guided along curves.

FIG. 6a, 6b illustrate two different embodiments with chain link bodies allowing a wide deflection.

FIG. 6c shows a further embodiment with which the conveyor chain is curved about an axis transversely to the conveyor chain surface in order to be guided about a curve for example. A straight section of this conveyor chain is shown in FIG. 6d. A lateral view of FIG. 6d is FIG. 6e. FIG. 6f shows the view of FIG. 6d in the deflected state and illustrates that the conveyor chain can be randomly deflected transversely to the deflection of FIG. 6c. The deflections of FIG. 6c, 6f can be randomly combined.

Adjacent chain links 7 in this case are interconnected via a connecting element 34 in the manner of a universal joint. To this end, the connecting element 34 practically has four connecting arms 35 which approximately extend cross-like and can be inserted in bores 36 of the axle arms 32, 33.

The connecting element 34 in this case can have a connecting channel 37, see FIG. 7a, which more preferably extends into all four connecting elements 34. This embodiment is suitable for a conveyor chain 3 with a power supply line as in FIG. 4d. If two power supply lines are provided as in FIG. 4a, the connecting element can comprise two separate connecting channels 37 more preferably in such a manner that a connecting channel extends into two adjacent connecting arms and a further connecting channel into the two other connecting arms.

The connecting channels 37 each terminate in a channel mouth 38, which is provided in the lateral surface of the respective connecting arm 35 and can be coupled to a channel mouth in the chain link 7 receiving the respective connecting arm, see FIGS. 7b to 7e.

The deflection of the conveyor chain 3 is illustrated in FIG. 8. Preferably, the deflection roller 2 comprises teeth 39 and/or recesses 40, which can be brought into engagement with the conveyor chain 3, thus comprises more preferably a toothed wheel or two or more toothed wheels. A rotation of the deflection roller 2 by means of an electric motor or the like thus causes a movement of the conveyor chain 3 in the conveying direction 6. The engagement is practically effected in the region of the connection between the chain links, e.g. on the axle pin 15 or on the connecting element 34, but can also be effected on the chain link body if the latter is suitably configured.

During the contact with the deflection roller 2 power is fed to the conveyor chain 3 in the known manner through a rotary lead-through. To this end, contact pins can establish the electrical connection to contact surfaces 27 or contact bores 28 and valves make possible a feeding-in of medium via the valves 31 in the power supply line.

FIG. 9 illustrates how the chain links 7 via a lateral guide 40 for example in the form of one or two guide rails can be deflected. This can be advantageous for example in order to deflect the receiving devices 4 in the direction of the work pieces 5 for picking up said work pieces or for releasing work pieces 5.

The chain links can be produced unitarily and have bores that form channels or channel sections. In addition it is possible to configure the chain links in multiple parts for the purpose of simpler manufacture and maintenance. Thus, a chain link can be provided with an upper shell and a lower shell, or an upper and/or a lower shell on a basic body or with a middle layer construction between an upper and a lower shell. Channels or channel sections can be formed in the upper shell, in the lower shell, in the basic body and/or in the middle layer construction. The individual parts can be screwed, glued or otherwise connected to one another preferentially in a releasable manner.

LIST OF REFERENCE NUMBERS

1 Conveyor device
2 Deflection roller
3 Conveyor chain
4 Receiving device
5 Work piece
6 Conveying direction
7 Chain link
8 Joint region
9 Electronic control element
10 Axle arm
11 Axle mounting
12 Axle bore
13 Head bore
14 Bearing bush
15 Axle pin
16 Axle pin axis
17, 18, 19 Bore
20 Seal
21 Arrow
22 O-ring
23 Valve opening
24 Cable channel
25 Cable
26 Passage opening
27 Contact surface
28 Contact bore
29 Arrow
30 Seal
31 Valve
32, 33 Axle arm
34 Connecting element
35 Connecting arm
36 Bore
37 Connecting channel
38 Channel mouth
39 Tooth
40 Recess
41 Guide

The invention claimed is:

1. A conveyor device with a) an endless conveyor element circulating between deflection rollers on which a receiving device for conveying goods to be conveyed is provided, and b) a power supply line, said power line designed to convey energy selected from the group consisting of electrical energy, compressed air, vacuum, and hydraulic fluid, said conveyor element is a conveyor chain with a plurality of chain links hinged together, each of said chain links includes a portion of said power supply line that is selected from the group consisting of a fluid channel, a fluid hose and an electrical cable, said chain links that are adjacently positioned to one another are coupled to each other, each of said chain links configured to enable access to said portion of said power supply line in said chain link.

2. The conveyor device as defined in claim 1, wherein said power supply line includes a fluid channel formed in each of said chain links.

3. The conveyor device as defined in claim 2, wherein each of said chain links comprises a connecting point for the connection to a preceding chain link and a connecting point for the connection to a following chain link, said power supply line in each of said chain links extends from the one to the other connecting point and a fluid seal is formed between each of said connection points of adjacently positioned chain links, said fluid seal inhibiting escape of fluid from said fluid channel as said fluid passes through adjacently positioned chain links.

4. The conveyor device as defined in claim 1, wherein each of said chain links include at one end first an second axle arms and on the other end an axle mounting said axle arms of said chain link designed to engage about an axle mounting of an adjacent chain link.

5. The conveyor device as defined in claim 4, including a fluid channel extending from said first axle arm to said axle mounting of said chain link and terminating in an end face of said axle mounting, said fluid channel forms a section of said power supply line in said chain link.

6. The conveyor device as defined in claim 5, a fluid channel extending from said second axle arm to said axle mounting and terminating in said end face of said axle mounting, said fluid channel forms a section of said power supply line in said chain link.

7. The conveyor device as defined in claim 4, wherein at least one of said first and second axle arms is hinged together with said axle mounting on an adjacently positioned chain link via an axle pin.

8. The conveyor device as defined in claim 7, wherein said axle pin comprises a pin channel, said pin channel designed to allow fluid flow through said pin channel and to enable fluid flow between two adjacently position chain links that are connected together by said axle pin.

9. The conveyor device as defined in claim 1, wherein said chain links that are adjacently positioned and are connected to one another via a connecting element in the form of a universal joint.

10. The conveyor device as defined in claim 9, wherein said connecting element includes a fluid channel designed to allow fluid flow through said fluid channel and to enable fluid flow between two adjacently position chain links that are connected together by said connecting element.

11. The conveyor device as defined in 9, wherein said connecting element includes four connecting arms which approximately extend in the shape of a cross.

12. The conveyor device as defined in claim 11, characterized in that a connecting channel extends into all four connecting arms.

13. The conveyor device as defined in claim 11, wherein said connecting channel in the form of a first fluid channel extends into first and second connecting arms and wherein said connecting channel in the form of a second fluid channel extends into said third and fourth connecting arms, said first and second fluid channels form a section of one of two power supply lines.

14. The conveyor device as defined in claim 11, wherein at least two of said connecting arms includes a fluid channel, said fluid channel designed to allow fluid flow through said fluid channel and to enable fluid flow between two adjacently position chain links that are connected together by said connecting element.

15. A conveyor chain for a conveyor device according to claim 1.

16. A chain link for a conveyor chain of a conveyor device according to claim 1.

17. The chain link according to claim 16, characterized in that it is formed of multiple parts.

18. The chain link according to claim 17, characterized in that it comprises one or more components selected from the group consisting of an upper shell, a lower shell, a basic body and a middle construction.

19. The chain link according to claim 16, characterized in that it is formed of plastic.

\* \* \* \* \*